(12) United States Patent
LaNore et al.

(10) Patent No.: US 9,796,118 B2
(45) Date of Patent: Oct. 24, 2017

(54) EXTRUDED EXPANDABLE BARRIER

(75) Inventors: Larry J. LaNore, Dryden, MI (US);
Nicolo Amico, Warren, MI (US)

(73) Assignee: SIKA TECHNOLOGY AG, Baar (CH)

( * ) Notice: Subject to any disclaimer, the term of this patent is extended or adjusted under 35 U.S.C. 154(b) by 729 days.

(21) Appl. No.: 12/863,129

(22) PCT Filed: Jan. 16, 2009

(86) PCT No.: PCT/US2009/031216
§ 371 (c)(1),
(2), (4) Date: Jan. 20, 2011

(87) PCT Pub. No.: WO2009/091953
PCT Pub. Date: Jul. 23, 2009

(65) Prior Publication Data
US 2011/0109003 A1 May 12, 2011

Related U.S. Application Data

(60) Provisional application No. 61/021,563, filed on Jan. 16, 2008.

(51) Int. Cl.
*B29C 44/18* (2006.01)
*B29C 47/00* (2006.01)
(Continued)

(52) U.S. Cl.
CPC .......... *B29C 44/188* (2013.01); *B29C 47/003* (2013.01); *B29C 47/0026* (2013.01); *B29C 47/0033* (2013.01); *B29C 47/06* (2013.01); *B29C 47/825* (2013.01); *B29C 47/827* (2013.01); *B29C 47/84* (2013.01); *B29C 47/90* (2013.01); *B29C 47/908* (2013.01); *B29C 47/92* (2013.01); *B62D 25/20* (2013.01); *B62D 29/002* (2013.01); *B29C 2947/9258* (2013.01);
(Continued)

(58) Field of Classification Search
CPC ..................................................... B29C 44/188
USPC .......................................................... 264/148
See application file for complete search history.

(56) References Cited

U.S. PATENT DOCUMENTS 3,954,366 A * 5/1976 Fields ..................... B29C 47/38
425/208
3,956,438 A 5/1976 Schippers
(Continued)

FOREIGN PATENT DOCUMENTS

EP 1790554 5/2007

OTHER PUBLICATIONS

International Search Report and Written Opinion for PCT/US2009/031216.
(Continued)

*Primary Examiner* — Larry Thrower
(74) *Attorney, Agent, or Firm* — Oliff PLC

(57) ABSTRACT

Disclosed are various embodiments of an extruded expandable barrier, and various processes and systems for manufacturing the same. Using various extrusion processes to form an extruded expandable barrier allows for a reduction in tooling costs while also allowing more flexible barrier designs. Such designs can be specifically tailored for a particular cavity or cavities to ensure that the barrier fills the cavity after expansion. In addition, design changes can occur with little to no tooling changes.

19 Claims, 18 Drawing Sheets

(51) Int. Cl.
*B29C 47/06* (2006.01)
*B29C 47/84* (2006.01)
*B29C 47/92* (2006.01)
*B62D 25/20* (2006.01)
*B62D 29/00* (2006.01)
*B29C 47/82* (2006.01)
*B29C 47/90* (2006.01)

(52) U.S. Cl.
CPC ................ *B29C 2947/9259* (2013.01); *B29C 2947/92095* (2013.01); *B29C 2947/92171* (2013.01); *B29C 2947/92514* (2013.01); *B29C 2947/92704* (2013.01); *B29C 2947/92866* (2013.01)

(56) References Cited

U.S. PATENT DOCUMENTS

| | | |
|---|---|---|
| 5,160,465 A | 11/1992 | Soderberg |
| 5,738,935 A | 4/1998 | Turk et al. |
| 2004/0262853 A1* | 12/2004 | Larsen et al. ................ 277/628 |

OTHER PUBLICATIONS

European Search Report issued in corresponding European Patent Application No. 09702098.6 dated May 30, 2016.

* cited by examiner

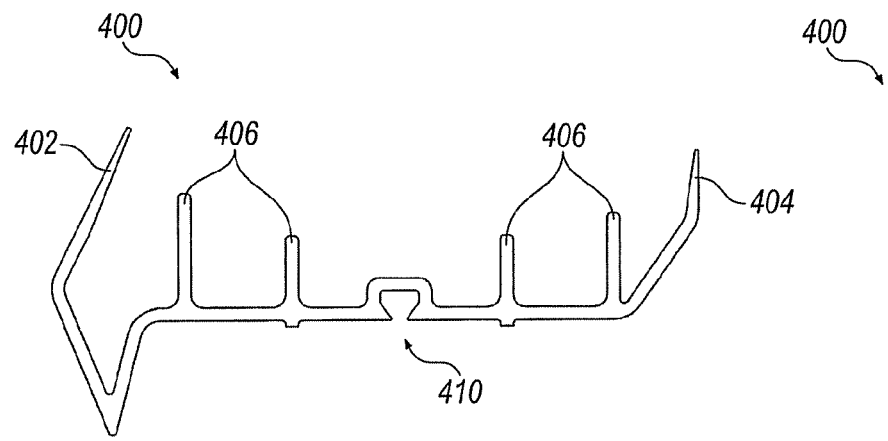
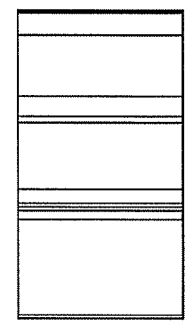
FIG. 9
FIG. 10
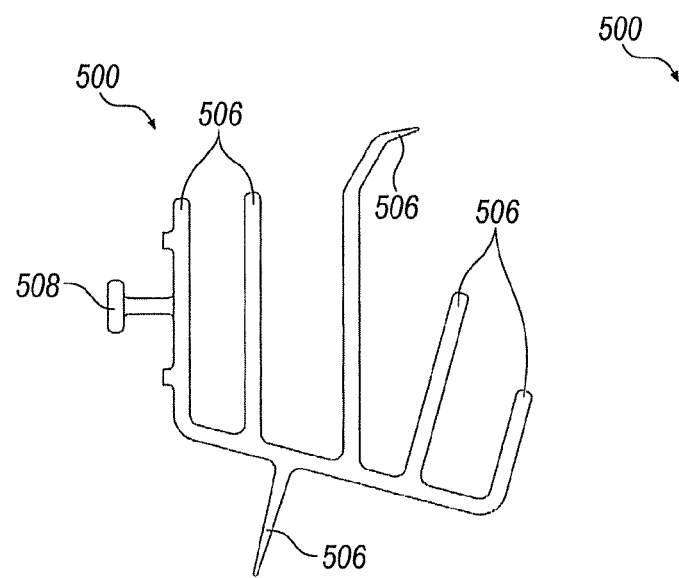
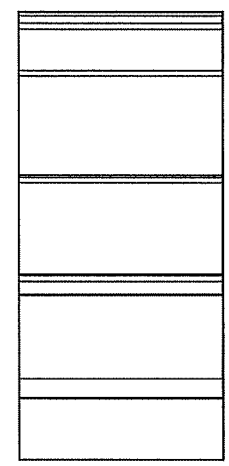
FIG. 11
FIG. 12

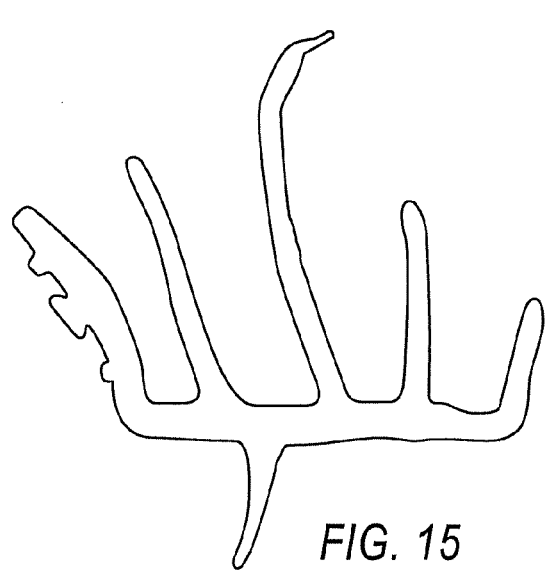 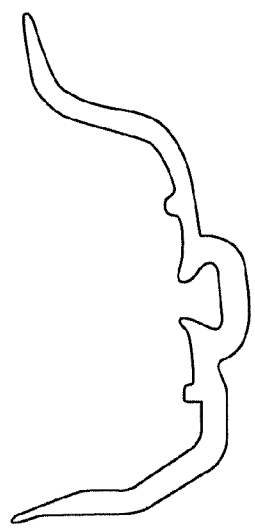
FIG. 15   FIG. 16
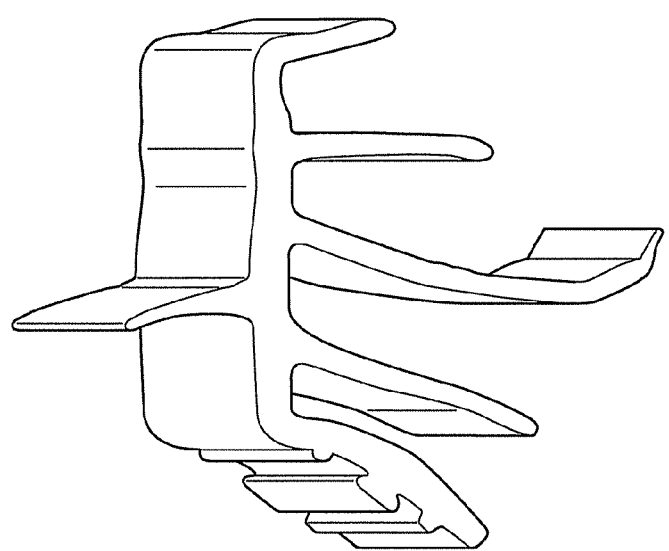 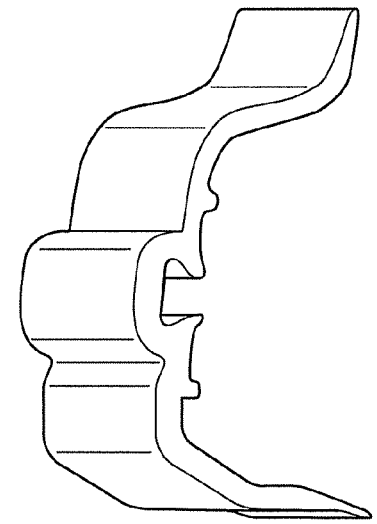
FIG. 17   FIG. 18

| Processing Information | | | | | | 212°F Bake (Shrink Test) | | Linear Shrink |
|---|---|---|---|---|---|---|---|---|
| SB-240 Extrusion | EXTR. # | SCREW # | RPMs | AVE WIDTH | AVE THK | Width | Length (101.6 original) | 101.6 |
| Run 1 | 607 | 2DS9 | 19.9 | 48.33 | 4.2 | 48 | 94 | -7.48% |
| Run 2 | | | 30.1 | - | - | 47.5 | 94 | -7.48% |
| Run 3 | | | 40.2 | 48.76 | 4.56 | 48 | 95 | -6.50% |
| Run 4 | | | 50.3 | - | - | 49 | 94 | -7.48% |
| Run 5 | | | 59.9 | 49.08 | 4.71 | 49 | 94 | -7.48% |
| Run 6 | | | 69.9 | - | - | 48.5 | 95 | -6.50% |
| Run 7 | | | 80.1 | 48.27 | 4.75 | 48 | 96 | -5.51% |
| | | | | | Average: | 48.3 | 94.6 | -6.92% |
| SB-255 Extrusion | EXTR. # | SCREW # | RPMs | AVE WIDTH | AVE THK | | | |
| Run 1 | 607 | 2DS9 | 20.3 | 48.92 | 3.84 | 49 | 100 | -1.57% |
| Run 2 | | | 39.9 | 48.49 | 4.06 | 49 | 99.5 | -2.07% |
| Run 3 | | | 59.8 | 47.99 | 4.17 | 48 | 100 | -1.57% |
| Run 4 | | | 79.9 | 47.27 | 4.22 | 47 | 100 | -1.57% |
| | | | | | Average: | 48.3 | 99.9 | -1.70% |
| SS-751 Extrusion | EXTR. # | SCREW # | RPMs | AVE WIDTH | AVE THK | | | |
| Run 1 | 607 | 2DS9 | 20.2 | - | - | 50 | 96 | -5.51% |
| Run 2 | | | 20.2 | - | - | 50 | 95 | -6.50% |
| Run 3 | | | 20.2 | - | - | 49 | 95 | -6.50% |
| Run 4 | | | 20.2 | 49.04 | 4.18 | 50 | 96 | -5.51% |
| Run 5 | | | 50 | 48.97 | 4.38 | 50 | 97 | -4.53% |
| Run 6 | | | 80.3 | - | - | 51.5 | 97 | -4.53% |
| Run 7 | | | 80.3 | 49.26 | 4.56 | 51 | 97 | -4.53% |
| | | | | | Average: | 50.2 | 96.1 | -5.37% |

FIG. 24

| | | | | | | Bake - 350°F | | | |
|---|---|---|---|---|---|---|---|---|---|
| Processing Information | | | | | | Length | Width | % _ | % _ |
| SB-240 Extrusion | EXTR. # | SCREW # | RPMs | AVE WIDTH | AVE THK | 101.6 | 48.6 | Length | Width |
| Run 1 | 607 | 2DS9 | 19.9 | 48.33 | 4.2 | 149 | 88 | 47% | 81% |
| Run 2 | | | 30.1 | - | - | 149 | 89 | 47% | 83% |
| Run 3 | | | 40.2 | 48.76 | 4.56 | 150 | 90 | 48% | 85% |
| Run 4 | | | 50.3 | - | - | 151 | 92 | 49% | 89% |
| Run 5 | | | 59.9 | 49.08 | 4.71 | 153 | 95 | 51% | 95% |
| Run 6 | | | 69.9 | - | - | 154 | 93 | 52% | 91% |
| Run 7 | | | 80.1 | 48.27 | 4.75 | 150 | 91 | 48% | 87% |
| | | | | | Average: | 150.9 | 91.1 | 48% | 87% |
| SB-255 Extrusion | EXTR. # | SCREW # | RPMs | AVE WIDTH | AVE THK | | 48.2 | | |
| Run 1 | 607 | 2DS9 | 20.3 | 48.92 | 3.84 | 140 | 85 | 38% | 76% |
| Run 2 | | | 39.9 | 48.49 | 4.06 | 143 | 100 | 41% | 108% |
| Run 3 | | | 59.8 | 47.99 | 4.17 | 149 | 85 | 47% | 76% |
| Run 4 | | | 79.9 | 47.27 | 4.22 | 149 | 78 | 47% | 62% |
| | | | | | Average: | 145.3 | 87.0 | 43% | 81% |
| SS-751 Extrusion | EXTR. # | SCREW # | RPMs | AVE WIDTH | AVE THK | | 49.1 | | |
| Run 1 | 607 | 2DS9 | 20.2 | - | - | 114 | 65 | 12% | 32% |
| Run 2 | | | 20.2 | - | - | 115 | 63 | 13% | 28% |
| Run 3 | | | 20.2 | - | - | 114 | 66 | 12% | 34% |
| Run 4 | | | 20.2 | 49.04 | 4.18 | 120 | 65 | 18% | 32% |
| Run 5 | | | 50 | 48.97 | 4.38 | 115 | 66 | 13% | 34% |
| Run 6 | | | 80.3 | - | - | 121 | 67 | 19% | 36% |
| Run 7 | | | 80.3 | 49.26 | 4.56 | 123 | 65 | 21% | 32% |
| | | | | | Average: | 117.4 | 65.3 | 16% | 33% |

FIG. 25

| Processing Information | | | | | | | | | | | | | | | |
|---|---|---|---|---|---|---|---|---|---|---|---|---|---|---|---|
| | EXTR. # | Screen Pack | ZONE 1 | ZONE 2 | ZONE 3 | DIE 1 | Material Temp @ Die | Material Temp @ Puller | FPM | FPH | Water Test | Height | Width | Length | THK |
| SB-240 Extrusion | | | | | | | | | | | | | | | |
| Run 1 | 2 ½" Davis Std. | 20 mesh | 160° | 170° | 190° | 200° | | 98° | 10 | 600 | Float | 16.9 | 23.1 | 101.6 | 3.2 |
| Run 2 | 2 ½" Davis Std. | 20 mesh | 160° | 170° | 190° | 200° | | 108° | 15 | 900 | Sink | 17.2 | 23 | 101.6 | 3.4 |
| Run 3 | 2 ½" Davis Std. | 20 mesh | 160° | 170° | 190° | 200° | | 110° | 20 | 1200 | Float | 17.2 | 24.6 | 101.6 | 3.7 |
| SB-255 Extrusion | | | | | | | | | | | | | | | |
| Run 1 | 2 ½" Davis Std. | 20 mesh | 160° | 165° | 175° | 195° | 178° | 105° | 10 | 600 | Float | 17.9 | 25.2 | 101.6 | 3.2 |
| Run 2 | 2 ½" Davis Std. | 20 mesh | 160° | 165° | 175° | 195° | 180° | 108° | 15 | 900 | Float | 17.4 | 24.8 | 101.6 | 3 |
| Run 3 | 2 ½" Davis Std. | 20 mesh | 160° | 165° | 175° | 195° | 184° | 113° | 20 | 1200 | Float | 17.5 | 24.8 | 101.6 | 3.2 |
| Run 4 | 2 ½" Davis Std. | 20 mesh | 160° | 165° | 175° | 195° | 191° | 124° | 30 | 1800 | Float | 17.4 | 24 | 101.6 | 3.1 |
| SS-751 Extrusion | | | | | | | | | | | | | | | |
| Run 1 | 2 ½" Davis Std. | 20 mesh | 160° | 170° | 185° | 195° | 180° | 111° | 10 | 600 | Sink | 18.6 | 25.7 | 101.6 | 3.6 |
| Run 2 | 2 ½" Davis Std. | 20 mesh | 160° | 170° | 185° | 195° | 186° | 99° | 10 | 600 | Sink | 18.5 | 25.5 | 101.6 | 3.8 |
| Run 3 | 2 ½" Davis Std. | 20 mesh | 160° | 170° | 185° | 195° | 189° | 101° | 15 | 900 | Float | 17.9 | 25.2 | 101.6 | 3.6 |
| Run 4 | 2 ½" Davis Std. | 20 mesh | 160° | 170° | 185° | 195° | 192° | 109° | 20 | 1200 | Sink | 16.6 | 23.7 | 101.6 | 3.4 |

FIG. 26

| | Processing Information | | | | | | | | | Bake - 350°F | | |
|---|---|---|---|---|---|---|---|---|---|---|---|---|
| | | | | | | | | | | 212°F Bake (Shrink Test) | Bake 350°F | Linear Shrink |
| | Material Temp @ Die | Material Temp @ Puller | FPM | FPH | Water Test | Height | Width | Length | THK | Width | Length (101.6 original) | |
| SB-240 Extrusion | | | | | | | | | | | | |
| Run 1 | 178° | 98° | 10 | 600 | Float | 16.9 | 23.1 | 101.6 | 3.2 | 26.8 | 70 | -31.10% |
| Run 2 | 180° | 108° | 15 | 900 | Sink | 17.2 | 23 | 101.6 | 3.4 | 26.5 | 75 | -26.18% |
| Run 3 | 184° | 110° | 20 | 1200 | Float | 17.2 | 24.6 | 101.6 | 3.7 | 26.7 | 76 | -25.20% |
| | | | | | | | | | Average: | 26.7 | 73.7 | -27.49% |
| SB-255 Extrusion | Material Temp @ Die | Material Temp @ Puller | FPM | FPH | Water Test | Height | Width | Length | THK | | | |
| Run 1 | 178° | 105° | 10 | 600 | Float | 17.9 | 25.2 | 101.6 | 3.2 | 27 | 91 | -10.43% |
| Run 2 | 180° | 108° | 15 | 900 | Float | 17.4 | 24.8 | 101.6 | 3 | 26.6 | 91 | -10.43% |
| Run 3 | 184° | 113° | 20 | 1200 | Float | 17.5 | 24.8 | 101.6 | 3.2 | 26.8 | 90 | -11.42% |
| Run 4 | 191° | 124° | 30 | 1800 | | 17.4 | 24 | 101.6 | 3.1 | 25.6 | 90 | -11.42% |
| | | | | | | | | | Average: | 26.5 | 90.5 | -10.93% |
| SS-751 Extrusion | Material Temp @ Die | Material Temp @ Puller | FPM | FPH | Water Test | Height | Width | Length | THK | | | |
| Run 1 | 180° | 111° | 10 | 600 | Sink | 18.6 | 25.7 | 101.6 | 3.6 | 30.5 | 90 | -11.42% |
| Run 2 | 186° | 99° | 10 | 600 | Sink | 18.5 | 25.5 | 101.6 | 3.8 | 30.2 | 90 | -11.42% |
| Run 3 | 189° | 101° | 15 | 900 | Float | 17.9 | 25.2 | 101.6 | 3.6 | 29.8 | 91 | -10.43% |
| Run 4 | 192° | 109° | 20 | 1200 | Sink | 16.6 | 23.7 | 101.6 | 3.4 | 28.4 | 87 | -14.37% |
| | | | | | | | | | Average: | 29.7 | 89.5 | -11.91% |

FIG. 27

| | Processing Information | | | | | | | | | | Bake - 350°F | | | | | |
|---|---|---|---|---|---|---|---|---|---|---|---|---|---|---|---|---|
| | Material Temp @ Die | Material Temp @ Puller | FPM | FPH | Water Test | Height | Width | Length | THK | Length | Width | Height | Length %Δ | Width %Δ | Height %Δ |
| SB-240 Extrusion | | | | | | | | | | | | | | | |
| Run 1 | 178° | 98° | 10 | 600 | Float | 16.9 | 23.1 | 101.6 | 3.2 | 140 | 63 | 49 | 38% | 173% | 190% |
| Run 2 | 180° | 108° | 15 | 900 | Sink | 17.2 | 23 | 101.6 | 3.4 | 145 | 64 | 49.5 | 43% | 178% | 188% |
| Run 3 | 184° | 110° | 20 | 1200 | Float | 17.2 | 24.6 | 101.6 | 3.7 | 150 | 70 | 51 | 48% | 185% | 197% |
| | | | | | | | | | Average: | 145.0 | 65.7 | 49.8 | 43% | 179% | 191% |
| SB-255 Extrusion | Material Temp @ Die | Material Temp @ Puller | FPM | FPH | Water Test | Height | Width | Length | THK | | | | | | |
| Run 1 | 178° | 105° | 10 | 600 | Float | 17.9 | 25.2 | 101.6 | 3.2 | 160 | 75 | 43 | 57% | 198% | 140% |
| Run 2 | 180° | 108° | 15 | 900 | Float | 17.4 | 24.8 | 101.6 | 3 | 160 | 69 | 40 | 57% | 178% | 130% |
| Run 3 | 184° | 113° | 20 | 1200 | Float | 17.5 | 24.8 | 101.6 | 3.2 | 160 | 67 | 41 | 57% | 170% | 134% |
| Run 4 | 191° | 124° | 30 | 1800 | Float | 17.4 | 24 | 101.6 | 3.1 | 160 | 69 | 41 | 57% | 188% | 136% |
| | | | | | | | | | Average: | 160.0 | 70.0 | 41.3 | 57% | 183% | 135% |
| SS-751 Extrusion | Material Temp @ Die | Material Temp @ Puller | FPM | FPH | Water Test | Height | Width | Length | THK | | | | | | |
| Run 1 | 180° | 111° | 10 | 600 | Sink | 18.6 | 25.7 | 101.6 | 3.6 | 104 | 49 | 15.8 | 2% | 91% | -15% |
| Run 2 | 186° | 99° | 10 | 600 | Sink | 18.5 | 25.5 | 101.6 | 3.8 | 107 | 48 | 15.5 | 5% | 88% | -16% |
| Run 3 | 189° | 101° | 15 | 900 | Float | 17.9 | 25.2 | 101.6 | 3.6 | 103 | 48 | 15.3 | 1% | 90% | -15% |
| Run 4 | 192° | 109° | 20 | 1200 | Sink | 16.6 | 23.7 | 101.6 | 3.4 | 99 | 45 | 14.6 | -3% | 90% | -12% |
| | | | | | | | | | Average: | 103.3 | 47.5 | 15.3 | 2% | 90% | -14% |

FIG. 28

| | | | | | | | Processing Information | | | | | | | | | | | | Testing | | | | | | Bake - 350°F | |
|---|---|---|---|---|---|---|---|---|---|---|---|---|---|---|---|---|---|---|---|---|---|---|---|---|---|---|---|
| | | | | | | | | | | | | | | | | | | | | | | | | | | % — | % — |
| SB-240 Extrusion | EXTR. # | SCREW # | RPMs | PSI | AMPs | ZONE 1 | ZONE 2 | ZONE 3 | CLAMP | DIE 1 | MELT TEMP | STOCK TEMP | FPH | lb/hr | AVE WIDTH | AVE THK | Width | (Shrink Test) (101.6 original) | Shrink 101.6 | Length 101.6 | Width 48.6 | Length | Width |
| Run 1 | 607 | 2DS9 | 19.9 | 310 | 19.1 | 160 | 175 | 185 | 190 | 185 | 171 | 199 | 168 | 20.4 | 48.33 | 4.2 | 48 | 94 | -7.48% | 149 | 88 | 47% | 81% |
| Run 2 | | | 30.1 | 320 | 19 | 160 | 175 | 185 | 190 | 185 | 173 | 205 | 252 | 31.1 | - | - | 47.5 | 94 | -7.48% | 149 | 89 | 47% | 83% |
| Run 3 | | | 40.2 | 320 | 18.8 | 161 | 175 | 185 | 190 | 185 | 175 | 214 | 373 | 41.5 | 48.76 | 4.56 | 48 | 85 | -6.50% | 150 | 90 | 48% | 85% |
| Run 4 | | | 50.3 | 320 | 18.6 | 161 | 175 | 185 | 190 | 186 | 177 | 215 | 394 | 52.3 | - | - | 49 | 94 | -7.48% | 151 | 92 | 49% | 89% |
| Run 5 | | | 59.9 | 320 | 18.4 | 161 | 175 | 185 | 191 | 185 | 179 | 218 | 467 | 62.9 | 49.08 | 4.71 | 49 | 94 | -7.48% | 153 | 95 | 51% | 95% |
| Run 6 | | | 69.9 | 330 | 18.6 | 161 | 170 | 181 | 185 | 180 | 180 | 220 | 557 | 74.3 | - | - | 48.5 | 95 | -6.50% | 154 | 93 | 52% | 91% |
| Run 7 | | | 80.1 | 340 | 18.4 | 163 | 170 | 181 | 185 | 180 | 181 | 223 | 663 | 86.7 | 48.27 | 4.75 | 48 | 96 | -5.51% | 150 | 91 | 48% | 87% |
| | | | | | | | | | | | | | | | Average: | | 48.3 | 94.6 | -6.92% | 150.9 | 91.1 | 48% | 87% |
| | | | | | | | | | | | | | | | | | | | | | | | |
| SB-255 Extrusion | EXTR. # | SCREW # | RPMs | PSI | AMPs | ZONE 1 | ZONE 2 | ZONE 3 | CLAMP | DIE 1 | MELT TEMP | STOCK TEMP | FPH | lb/hr | AVE WIDTH | AVE THK | Width | | | | | | |
| Run 1 | 607 | 2DS9 | 20.3 | 240 | 16 | 160 | 175 | 185 | 190 | 185 | 167 | 196 | 184 | 20.4 | 48.92 | 3.84 | 49 | 100 | -1.57% | 140 | 85 | 38% | 76% |
| Run 2 | | | 39.9 | 250 | 16.4 | 161 | 175 | 185 | 190 | 185 | 170 | 204 | 357 | 40.7 | 48.49 | 4.06 | 49 | 98.5 | -2.07% | 143 | 100 | 41% | 108% |
| Run 3 | | | 59.8 | 250 | 16.6 | 162 | 175 | 186 | 190 | 185 | 173 | 211 | 519 | 60.5 | 47.99 | 4.17 | 48 | 100 | -1.57% | 143 | 85 | 47% | 76% |
| Run 4 | | | 79.9 | 250 | 16.3 | 163 | 175 | 185 | 190 | 184 | 175 | 215 | 681 | 79.6 | 47.27 | 4.22 | 47 | 100 | -1.57% | 149 | 78 | 47% | 62% |
| | | | | | | | | | | | | | | | Average: | | 48.3 | 99.9 | -1.70% | 145.3 | 87.0 | 43% | 81% |
| | | | | | | | | | | | | | | | | | | | | | | | |
| SS-751 Extrusion | EXTR. # | SCREW # | RPMs | PSI | AMPs | ZONE 1 | ZONE 2 | ZONE 3 | CLAMP | DIE 1 | MELT TEMP | STOCK TEMP | FPH | lb/hr | AVE WIDTH | AVE THK | Width | | | | | | |
| Run 1 | 607 | 2DS9 | 20.2 | 250 | 18.3 | 160 | 175 | 185 | 190 | 185 | 171 | 197 | - | - | - | - | 50 | 96 | -5.51% | 114 | 65 | 12% | 32% |
| Run 2 | | | 20.2 | 300 | 22.1 | 152 | 163 | 173 | 184 | 173 | 165 | 188 | - | - | - | - | 50 | 95 | -6.50% | 115 | 63 | 13% | 28% |
| Run 3 | | | 20.2 | 260 | 18.5 | 150 | 165 | 175 | 195 | 190 | 166 | 190 | - | - | - | - | 49 | 85 | -6.50% | 114 | 66 | 12% | 34% |
| Run 4 | | | 20.2 | 260 | 18.4 | 160 | 175 | 185 | 190 | 185 | 170 | 193 | 207 | 29.6 | 49.04 | 4.18 | 50 | 96 | -5.51% | 120 | 65 | 18% | 32% |
| Run 5 | | | 50 | 280 | 17.2 | 161 | 175 | 185 | 190 | 185 | 178 | 212 | 497 | 70.4 | 48.97 | 4.38 | 50 | 97 | -4.53% | 115 | 66 | 13% | 34% |
| Run 6 | | | 80.3 | 290 | 18.1 | 161 | 175 | 185 | 190 | 185 | 180 | 225 | - | - | - | - | 51.5 | 97 | -4.53% | 121 | 67 | 19% | 36% |
| Run 7 | | | 80.3 | 290 | 18.1 | 169 | 175 | 177 | 180 | 180 | 181 | 228 | 767 | 109 | 49.26 | 4.56 | 51 | 97 | -4.53% | 123 | 65 | 21% | 32% |
| | | | | | | | | | | | | | | | Average: | | 50.2 | 96.1 | -5.37% | 117.4 | 65.3 | 16% | 33% |

*FIG. 29*

| | | | | | | | Processing Information | | | | | | | | | Testing | | | | | | | Bake - 350°F | | |
|---|---|---|---|---|---|---|---|---|---|---|---|---|---|---|---|---|---|---|---|---|---|---|---|---|---|
| | | | | | | | | Material Temp @ Die | Material Temp @ Puller | | | Water Test | | | | | (Shrink Test) | | | | | | | | |
| | EXTR. # | Screen Pack | ZONE 1 | ZONE 2 | ZONE 3 | DIE 1 | | | | FPM | FPH | | Height | Width | Length | THK | Width | Length (101.6 original) | Shrink 101.6 | Length | Width | Height | % Length | % Width | % Height |
| SB-240 Extrusion | | | | | | | | | | | | | | | | | | | | | | | | | |
| Run 1 | 2_"Davis Std | 20 mesh | 160° | 170° | 190° | 200° | | 98° | 10 | 600 | Float | 16.9 | 23.1 | 101.6 | 3.2 | 25.8 | 70 | -31.10% | 140 | 63 | 49 | 38% | 173% | 190% |
| Run 2 | 2_"Davis Std | 20 mesh | 160° | 170° | 190° | 200° | | 108° | 110° | 15 | 900 | Sink | 17.2 | 23 | 101.6 | 3.4 | 26.5 | 75 | -26.18% | 145 | 64 | 49.5 | 43% | 178% | 188% |
| Run 3 | 2_"Davis Std | 20 mesh | 160° | 170° | 190° | 200° | | | 110° | 20 | 1200 | Float | 17.2 | 24.6 | 101.6 | 3.7 | 26.7 | 76 | -25.20% | 150 | 70 | 51 | 48% | 185% | 197% |
| | | | | | | | | | | | | | | | | Average: | 26.7 | 73.7 | -27.49% | 145.0 | 66.7 | 49.8 | 43% | 179% | 191% |
| SB-255 Extrusion | | | | | | | | Material Temp @ Die | Material Temp @ Puller | | | Water Test | | | | | | | | | | | | | |
| Run 1 | 2_"Davis Std | 20 mesh | 160° | 165° | 175° | 185° | | 178° | 105° | 10 | 600 | Float | 17.9 | 25.2 | 101.6 | 3.2 | 27 | 91 | -10.43% | 160 | 75 | 43 | 57% | 195% | 140% |
| Run 2 | 2_"Davis Std | 20 mesh | 160° | 165° | 175° | 185° | | 180° | 108° | 15 | 900 | Float | 17.4 | 24.8 | 101.6 | 3 | 26.6 | 91 | -10.43% | 160 | 69 | 40 | 57% | 178% | 130% |
| Run 3 | 2_"Davis Std | 20 mesh | 160° | 165° | 175° | 185° | | 184° | 113° | 20 | 1200 | Float | 17.5 | 24.8 | 101.6 | 3.2 | 26.8 | 90 | -11.42% | 160 | 67 | 41 | 57% | 170% | 134% |
| Run 4 | 2_"Davis Std | 20 mesh | 160° | 165° | 175° | 185° | | 191° | 124° | 30 | 1800 | Float | 17.4 | 24 | 101.6 | 3.1 | 25.6 | 90 | -11.42% | 160 | 69 | 41 | 57% | 188% | 135% |
| | | | | | | | | | | | | | | | | Average: | 28.5 | 90.5 | -10.93% | 160.0 | 70.0 | 41.3 | 57% | 183% | 135% |
| SS-751 Extrusion | | | | | | | | Material Temp @ Die | Material Temp @ Puller | | | Water Test | | | | | | | | | | | | | |
| Run 1 | 2_"Davis Std | 20 mesh | 160° | 170° | 185° | 195° | | 180° | 111° | 10 | 600 | Srk | 18.6 | 25.7 | 101.6 | 3.6 | 30.5 | 90 | -11.42% | 104 | 49 | 15.8 | 2% | 91% | -15% |
| Run 2 | 2_"Davis Std | 20 mesh | 160° | 170° | 185° | 195° | | 186° | 99° | 10 | 600 | Srk | 18.5 | 26.5 | 101.6 | 3.8 | 30.2 | 90 | -11.42% | 107 | 48 | 15.5 | 5% | 88% | -16% |
| Run 3 | 2_"Davis Std | 20 mesh | 160° | 170° | 185° | 195° | | 189° | 101° | 15 | 900 | Float | 17.9 | 25.2 | 101.6 | 3.6 | 29.8 | 91 | -10.43% | 103 | 48 | 15.3 | 1% | 90% | -15% |
| Run 4 | 2_"Davis Std | 20 mesh | 160° | 170° | 185° | 195° | | 192° | 109° | 20 | 1200 | Srk | 16.6 | 23.7 | 101.6 | 3.4 | 28.4 | 87 | -14.37% | 89 | 45 | 14.6 | -3% | 90% | -12% |
| | | | | | | | | | | | | | | | | Average: | 29.7 | 89.5 | -11.91% | 103.3 | 47.5 | 15.3 | 2% | 90% | -14% |

FIG. 30

EXTRUDED EXPANDABLE BARRIER

CROSS-REFERENCE TO RELATED APPLICATIONS

This application is a National Phase of International Application No. PCT/US2009/031216, filed on Jan. 16, 2009, which claims the benefit of U.S. Provisional Patent Application Ser. No. 61/021,563, filed on Jan. 16, 2008, which applications are hereby incorporated by reference in their entirety.

BACKGROUND OF THE INVENTION

Barriers are commonly used to seal orifices in certain objects. For example, barriers are commonly used in various parts of a motor vehicle to prevent noise, fumes, dirt, water, and the like from passing through from one area to another. A motor vehicle door panel typically has several small orifices in the sheet metal for manufacturing, assembly, and weight reduction reasons. Further, various structural components of motor vehicle bodies typically include a variety of orifices, hollow posts, cavities, passages and openings that could allow contaminants from the engine and the roadway into the passenger compartment.

BRIEF DESCRIPTION OF THE DRAWINGS

FIG. 9 is a profile view of another example of an extruded expandable barrier.

FIG. 10 is a side view of the extruded expandable barrier shown in FIG. 9.

FIG. 11 is a profile view of another example of an extruded expandable barrier.

FIG. 12 is a side view of the extruded expandable barrier shown in FIG. 11.

FIG. 15 is a profile view of the extruded expandable barrier shown in FIG. 11.

FIG. 16 is a profile view of the extruded expandable barrier shown in FIG. 5.

FIG. 17 is a side view of the extruded expandable barrier shown in FIG. 11.

FIG. 18 is a side view of the extruded expandable barrier shown in FIG. 5.

FIG. 24 is a table representing shrink test results, and illustrating different results using various screw speeds (RPMs), and barrier dimensions.

FIG. 25 is a table representing free bake expansion results.

FIG. 26 is a table representing various extrusion process testing runs using various extrusion parameters to form barriers of various shapes and sizes.

FIG. 27 is a table representing shrink test results.

FIG. 28 is a table representing free bake expansion test results.

FIG. 29 is another table representing various extrusion process testing runs using various extrusion parameters to form barriers of various shapes and sizes.

FIG. 30 is another table representing various extrusion process testing runs using various extrusion parameters to form barriers of various shapes and sizes.

DETAILED DESCRIPTION

Figure 1:
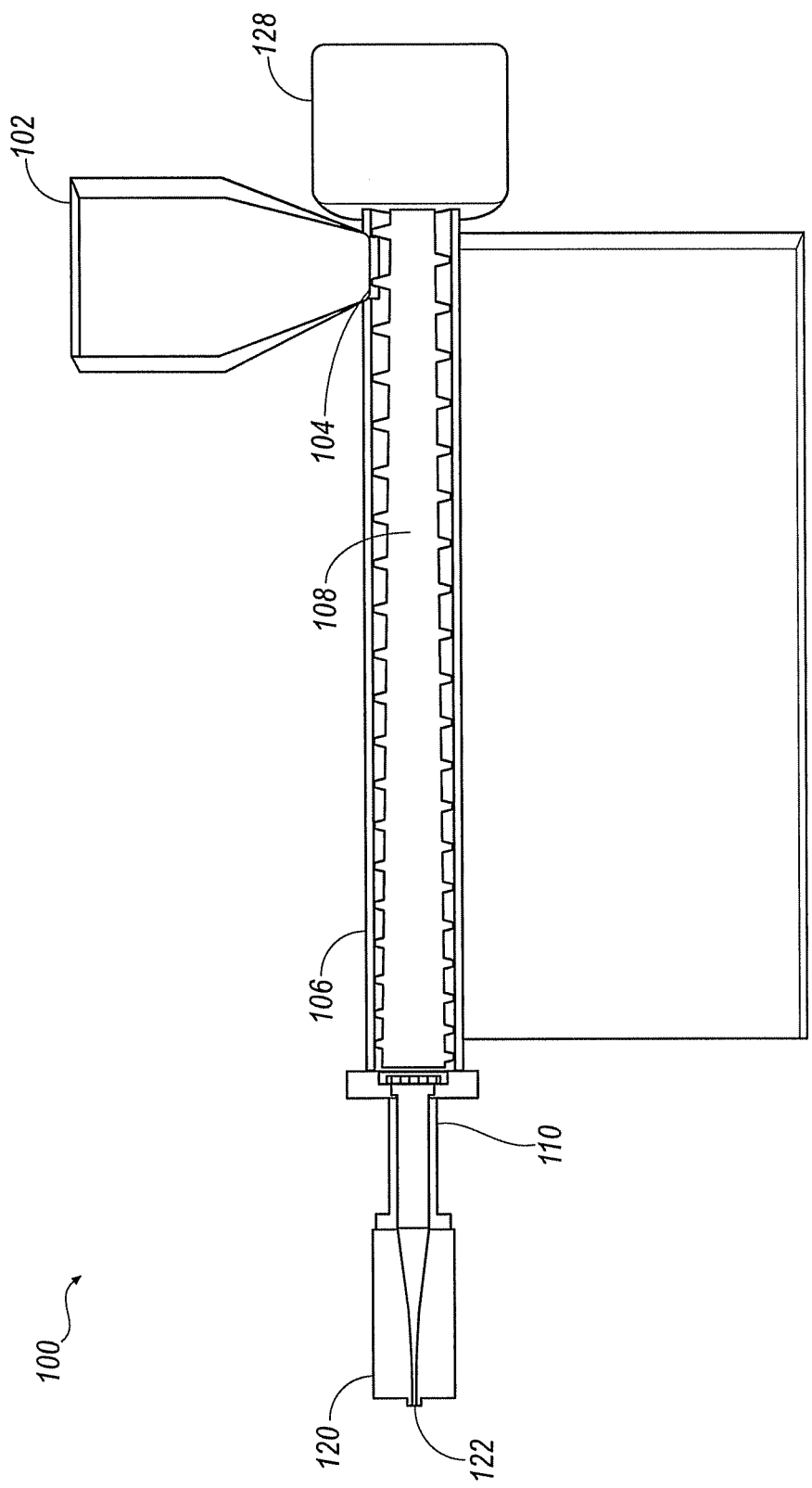
FIG. 1 illustrates an exemplary extrusion system.

Expandable barriers are typically barriers made from an expandable material and formed to fit within a cavity. After being placed inside a cavity, expandable barriers generally undergo an activation process, where the expandable barrier expands to fill the cavity and create a physical barrier. Many expandable barriers are developed using injection molding processes, such as 2-shot or over-molding. However, such injection molting processes are costly, time-consuming, and inflexible. For example, any design change typically requires expensive tooling changes and may require new tooling all together. Thus, in injection molding processes, it is very difficult and often expensive to make even minor design changes.

Disclosed are various embodiments of an extruded expandable barrier, and various processes and systems for manufacturing the same utilizing extrusion processes. Using various extrusion processes to form an expandable barrier allows for a reduction in tooling costs, while also allowing more flexible barrier designs. Such designs can be specifically tailored for a particular cavity or cavities to ensure that the barrier fills the cavity after expansion. In addition, design changes can occur with little to no tooling changes. For example, using an extrusion system allows for easily modifying a barrier with minimal time, effort, and tooling costs. Through the disclosed processes and systems, a barrier can easily be modified by adding, removing, or changing the length, shape, protrusions, fingers, ribs, etc.

Using the disclosed extrusion processes, the cut length of expandable barriers can be easily changed, thereby changing the amount of expandable material that is in a cavity. Such a process offers easy adjustment to the parts with little to no tooling costs. Further, the disclosed extrusion processes provide a very consistent part performance because it puts low amounts of stress into the material of the barrier part. It accomplishes this by keeping the shear stress in the material low during the manufacturing process. In addition, the disclosed extrusion processes can reduce vehicle complexity by allowing the same barrier part design to be used for both sides of the vehicle, thus cutting barrier part numbers in half.

Such extruded barrier parts can be attached to a vehicle by adding a fastener, capturing the barrier part in weld seams, adding tabs to the sheet metal, or designing an integrated fastener that is extruded in the part design that will attach to the sheet metal. Further, such extruded barriers can be designed with or without an additional material for a carrier. Extruded barriers can be co-extruded or in-line extruded with other materials to provide multiple expansion results as well. In addition, extruded barriers can be extruded flat and die cut to shape if required.

Various additional processes can also be utilized to create more complex extruded barriers. For example, some processes can also utilize die cutting for more complex cavities so that extruded barriers can fit into a cavity properly, or even to allow tubes to be installed prior to bake out, such as drain tubes. This will allow 100% sealing around the drain tube.

The disclosed extrusion processes can create flat or profile extruded expandable barriers for various cavities. Generally, a thermoplastic expandable material is used to create such extruded expandable barriers. Thermoplastic expandable materials are generally materials that soften when heated and harden when cooled, and expands upon activation. Generally, such materials are activated using heat, although an expandable material may be activated by a chemical reaction, radiation exposure, microwave exposure, electricity, etc. One example of a suitable expandable material is a heat activated material. For example, the Sika Corporation of Madison Heights, Mich., sells such thermoplastic expandable materials under the SIKABAFFLE trade name, which are described in the following U.S. patents, all of which are incorporated herein by reference in their entireties: U.S. Pat. Nos. 5,266,133; 5,373,027; 6,150,428; 6,368,438; and 6,387,470. Other examples of materials that can be used are also provided by the Sika Corporation are SB-240, SB-255, SB-300, and SB-751. Other materials that are capable of undergoing the described extrusion process can also be used, including those that can expand from less than 100% to over 2000%.

FIG. 1 illustrates one example of an extrusion system 100 for manufacturing extruded expandable barriers. System 100 includes a hopper 102, a barrel 106, an extrusion screw 108, a screw drive motor 110, and a die 120. Typically, an expandable material is provided in a solid or a liquid form. For example, one of the above mentioned SIKABAFFLE expandable materials may be provided in solid form, such as in pellets, and placed in hopper 102. The expandable material may be gravity fed into barrel 106, where heat is applied to the material to make it more pliable. The expandable material leaves hopper 102 and enters barrel 106 through a feedthroat 104, which is typically an opening near the rear of barrel 106, where the expandable material comes into contact with extrusion screw 108. Generally, system 100 uses a combination of heating elements and shear heating from extrusion screw 108 to apply heat to the expandable material inside barrel 106. Extrusion screw 108, which is driven by a screw drive motor 128, rotates and forces the expandable material through die 120 in order to form the expandable material into a desired shape, thereby forming an extruded barrier. Die 120 may also include a profiler 122. Profiler 122 is typically a removable plate with a shaped opening that can be used in conjunction with die 120 to form the expandable material into a desired shape. Profiler 122 may also be a screen or some other removable component used to further shape the expandable material into a barrier. The expandable material can be cooled to cause it to solidify into a more solid and less pliable state as it is pulled through die 120, or after leaving die 120.

A heating profile may be used and altered based on various factors, such as the type of material and the desired dimensions of extruded barrier. A heating profile is generally a pre-determined set of heating parameters that control one or more temperature devices in an extrusion system, such as system 100. A heating profile may be set for barrel 106 in which three or more independently controlled heaters gradually increase the temperature of barrel 106 from the rear (where the plastic enters at feedthroat 104) to the front at die 120. This allows the expandable material to be heated gradually as the material is pushed through barrel 106, thereby lowering the risk of overheating. Extra heat is contributed by the intense pressure and friction taking place inside barrel 106. Cooling fans, water lines, or other cooling devices may also be used to ensure that the temperature is maintained below a pre-set limit. System 100 may also include any number and variety of additional components, including one or more controllers, computers, microcontrollers, temperature sensors, pressure sensors, speed sensors, and feedback control systems to change one or more operating parameters based on the output from one or more sensors.

Generally, the temperature, or heating profile, is based on various factors, including the material parameters. Because many expandable materials are heat activated, the temperature of the material is generally maintained below the expandable material's specific activation temperature to prevent premature expansion. When using SIKABAFFLE expandable materials, for example, the temperature is generally kept below 350° F., and for some materials, may need to be kept below 250° F. Generally, the precise temperature may need to be established through various trials to compensate for differences in expandable material properties, extrusion systems, and extruded barrier designs. Furthermore, as will be described in greater detail below, additional parameters may be modified to produce different results. For example, system 100 may utilize different dies, profilers, barrels, and types of screws. For example, various types of screws may use optional components, such as mixing pins or the like. Furthermore, system 100 may utilize different heating profiles, screw speeds (generally in rotations per minute (RPM)), barrel pressures, die pressures, different dies, profilers, or any other parameter or component.

Generally, the expandable material is forced through die 120 and out of profiler 122. Die 120 and profiler 122 give the final expandable barrier product its profile shape. A profile shape is generally designed to ensure that the expandable barrier can fit within a particular cavity, and also create a desired physical barrier after undergoing an expansion process. Typically, the expandable barrier's size and shape are generally dictated by the size and shape of the cavity or orifice into which the barrier is to be inserted. FIGS. 2-12 illustrate several examples of potential shapes and configurations of extruded expandable barriers, but are by no way an exhaustive or exclusive representation of the various shapes and configurations of barriers that are capable of being formed using the disclosed extrusion process.

Figure 2:
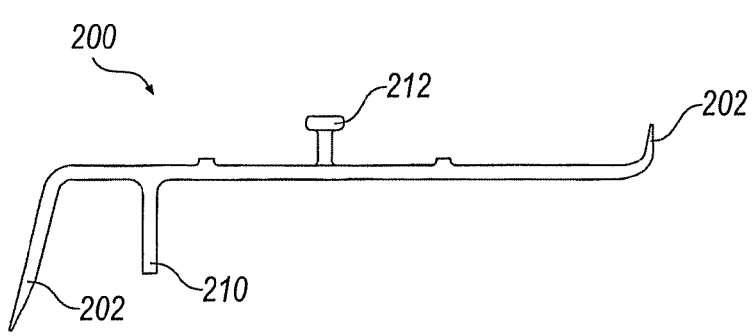
FIG. 2 is a profile view of one example of an extruded expandable barrier.
Figure 3:
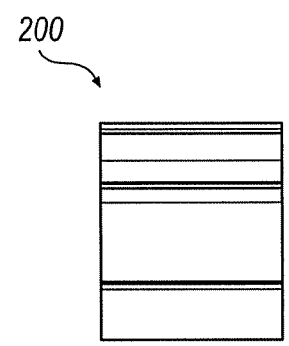
FIG. 3 is a side view of the extruded expandable barrier shown in FIG. 2.
Figure 4:
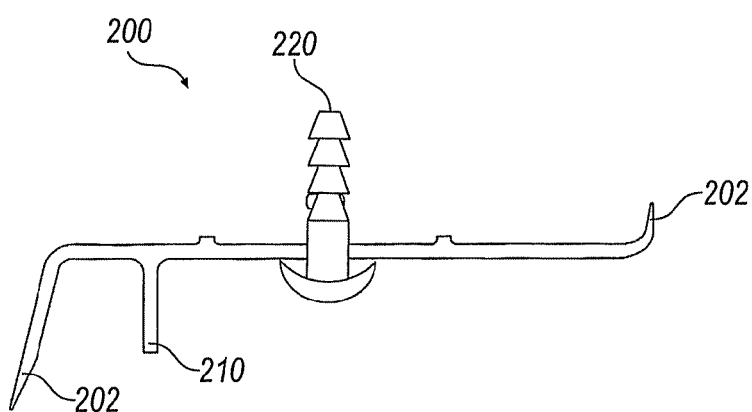
FIG. 4 is a profile view of the extruded expandable barrier shown in FIG. 2 with a fastener.

FIGS. 2-4 illustrate one example of an extruded expandable barrier 200. FIG. 2 is a profile view of extruded expandable barrier 200, and FIG. 3 is a side view. As shown in FIG. 2, expandable barrier 200 is an extrusion having curved flanges 202, 204 at each end, and having one or more protrusions or fingers 210, 212 along an elongated middle section. A protrusion, such as protrusion 212, may be shaped to interlock with another barrier, or with a cavity area. Protrusion 212, for example, is generally "T" shaped and configured to interlock with a slot in another barrier, or within a recess in a cavity. As shown, barrier 200 is approximately 135.5 mm in length, and approximately 45.6 mm in width. The flexibility of extrusion processes allows a manufacturer to easily change the shape and dimensions of any barrier, including barrier 200. In addition, because barrier 200 is an extruded part, it can be cut to almost any desired length, which will generally depend on the particular cavity to be filled by barrier 200. As shown in FIG. 3, barrier 200 is cut to a length of approximately 38.1 mm. Barrier 200 may also include one or more additional components, such as a fastener 220, as shown in FIG. 4. Fastener 220 is generally a mechanical fastener used to secure barrier 200 within a desired location with a cavity.

Figure 5:
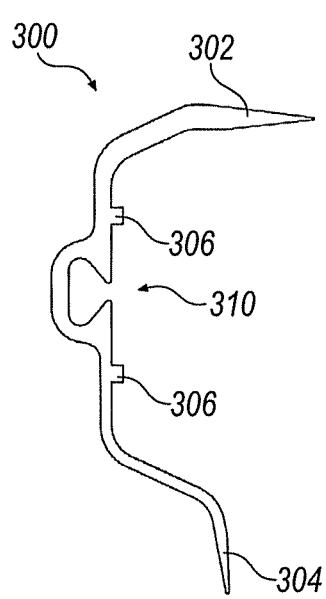
FIG. 5 is a profile view of another example of an extruded expandable barrier.
Figure 6:
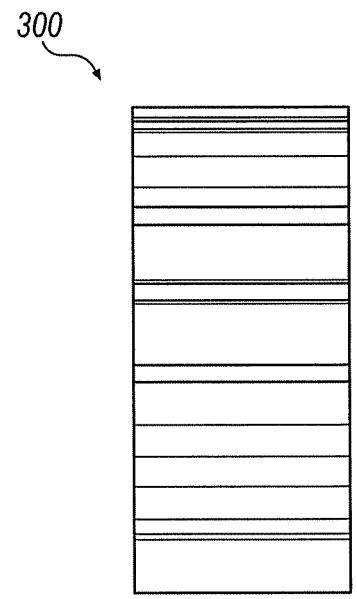
FIG. 6 is a side view of the extruded expandable barrier shown in FIG. 5.
Figure 7:
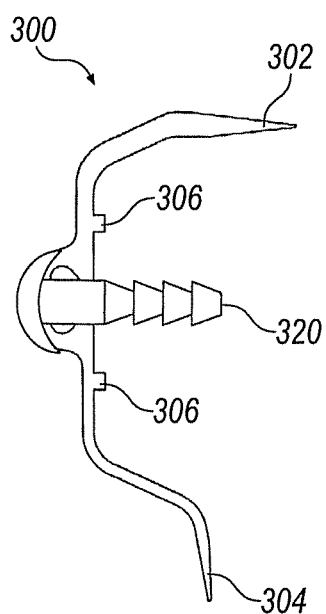
FIG. 7 is a profile view of the extruded expandable barrier shown in FIG. 5 with a fastener.
Figure 8:
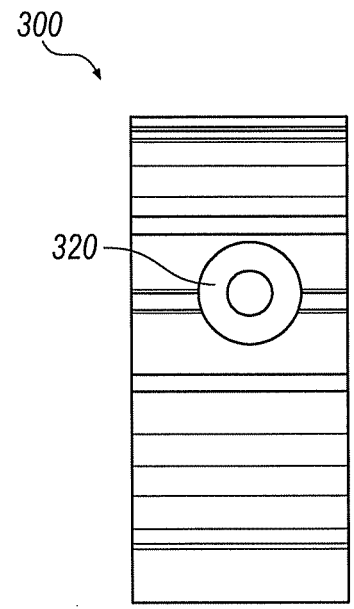
FIG. 8 is a side view of the extruded expandable barrier shown in FIG. 5 with a fastener.

FIGS. 5-8 illustrate another example of an extruded expandable barrier 300. FIG. 5 is a profile view of extruded expandable barrier 300, and FIG. 6 is a side view. Barrier 300 is generally "C" shaped with end flanges 302, 304 that can curve and taper off. Barrier 300 also includes one or more protrusions 306, and includes a slot 310 located approximately mid-way along the length of barrier 300. Slot 310 is configured to interlock or complement a generally "T" shaped protrusion, such as protrusion 212 of barrier 200. As shown in FIGS. 5-8, barrier 300 is generally about 46.1 mm in width and 86.6 mm in length, and is cut to a length of 38.1 mm, although barrier 300 can be cut to any length, as previously discussed. Furthermore, as previously discussed, barrier 300 may also include a fastener 320, as shown in FIGS. 7-8, to secure barrier 300 in place within a cavity. Barrier 300, as well as many other designs of an extruded expandable barrier, may also be secured in a cavity by relying on the resilient nature of the expandable material formed to shape. For example, end flanges 302, 304 may be wedged into a groove or corner of a cavity area, securing barrier 300 in place using an interference fit. In addition, a cavity may include a protrusion that can mate with slot 320. For example, barrier 300 may include a slot 310 that is specifically designed to snugly slide over a protrusion formed within a cavity.

FIGS. 9-10 illustrate yet another example of an extruded expandable barrier 400, where FIG. 9 is a profile view of extruded expandable barrier 400, and FIG. 10 is a side view. As shown in FIG. 9, barrier 400 includes end flanges 402, 404 that bend, curve, and taper off at their respective end portions. Barrier 400 also includes one or more fingers or protrusions 606, and includes a slot 410 located approximately mid-way along the length of barrier 400. Slot 410 is also configured to interlock or complement a generally "T" shaped protrusion, such as protrusion 212 of barrier 200. As shown in FIGS. 9-10, barrier 400 is generally about 151 mm in length, 72.5 mm in width, and is cut to a length of 38.1 mm, although barrier 400 can be cut to any length, as previously discussed. Like other barriers, barrier 400 may also be secured in a cavity by relying on the resilient nature of the expandable material, or barrier 400 may include one or more fasteners.

FIGS. 11-12 illustrate yet another example of an extruded expandable barrier 500, where FIG. 11 is a profile view of extruded expandable barrier 500, and FIG. 12 is a side view. As shown in FIG. 11, barrier 500 includes a plurality of fingers or protrusions 506 of various shapes, sizes, and orientations. Barrier 500 may also include a generally "T" shaped protrusion 508 that is configured to interlock or complement a slot, such as slot 410 of barrier 400. As shown in FIGS. 11-12, barrier 500 is generally about 80 mm in length, 85.3 mm in width, and is cut to a length of 38.1 mm, although barrier 500 can be cut to any length, as previously discussed. Like other barriers, barrier 500 may also be secured in a cavity by relying on the resilient nature of the expandable material, or barrier 500 may include one or more fasteners.

Figure 13:
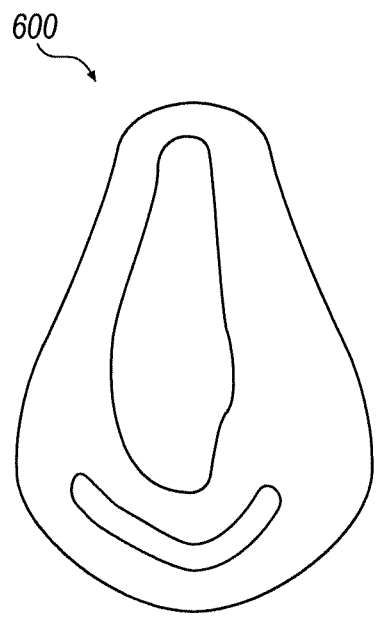
FIG. 13 is a profile view of another example of an extruded expandable barrier.
Figure 14:
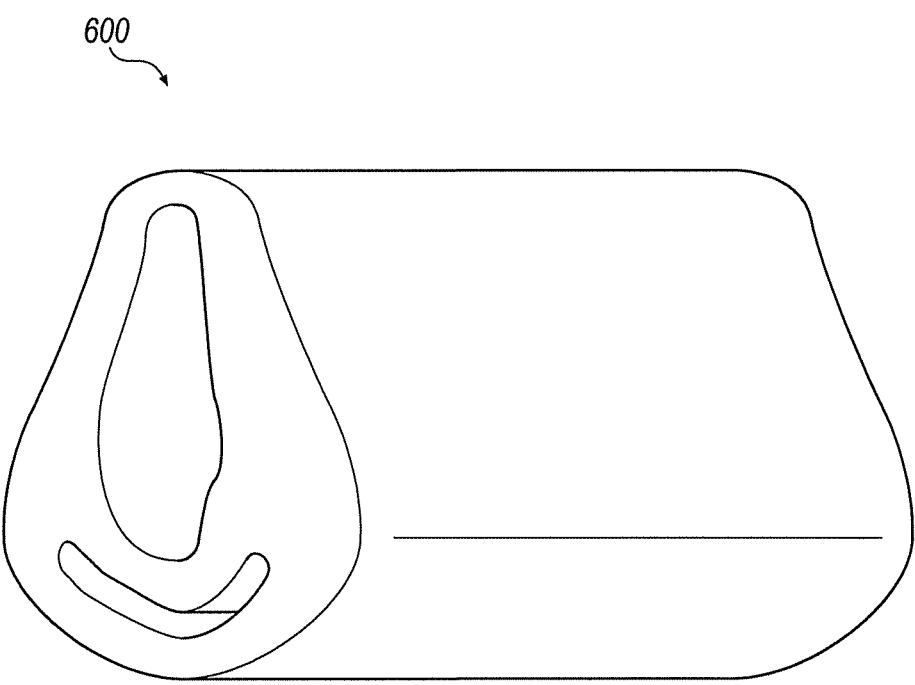
FIG. 14 is a side view of the extruded expandable barrier shown in FIG. 13.

FIGS. 13-14 illustrate yet another example of an extruded expandable barrier 600, where FIG. 13 is a profile view of extruded expandable barrier 600, and FIG. 14 is a side view. As shown, barrier 600 is an oblong shape with a plurality of interior cavities of various shapes and sizes. FIG. 14 is a side view illustrating that barrier 600 can be extruded to substantial lengths, or cut into shorter, individual pieces.

FIG. 15 is a profile view of extruded expandable barrier 500 shown in FIG. 11, and FIG. 16 is a profile view of extruded expandable barrier 300 shown in FIG. 5. FIG. 17 is a side view of extruded expandable barrier 500 shown in FIG. 11, and FIG. 18 is a side view of extruded expandable barrier 300 shown in FIG. 5.

Figure 19:
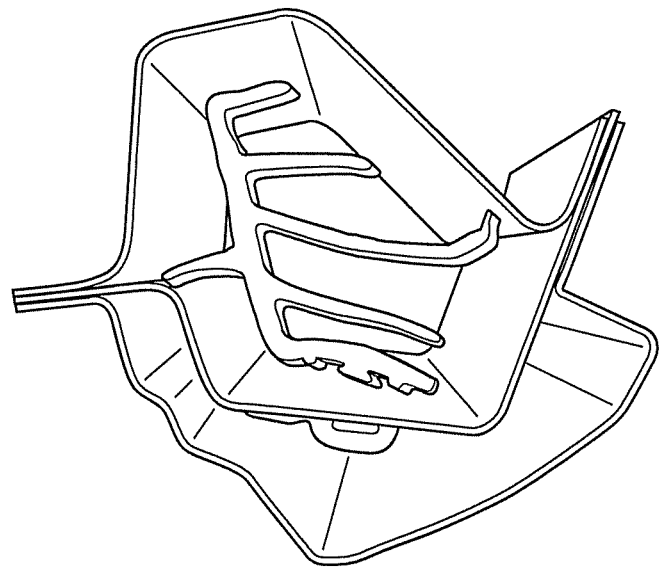
FIGS. 19-20 illustrate the extruded expandable barriers shown in FIGS. 5 & 11 in a pre-expansion state and secured within a cavity.
Figure 20:
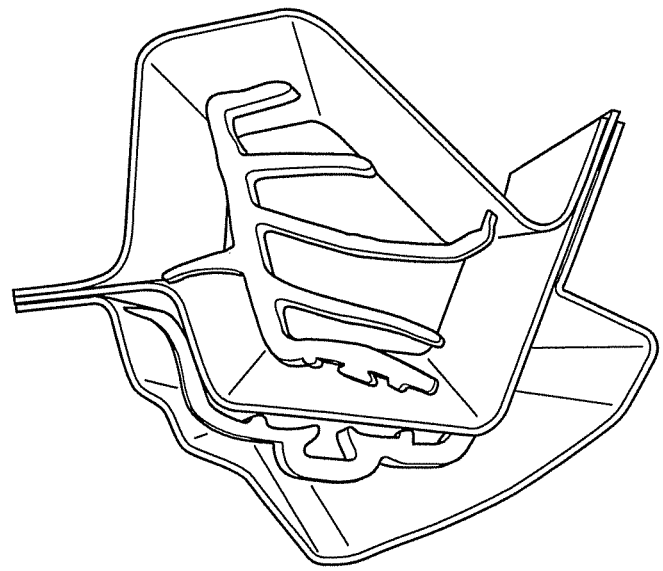
Figure 21:
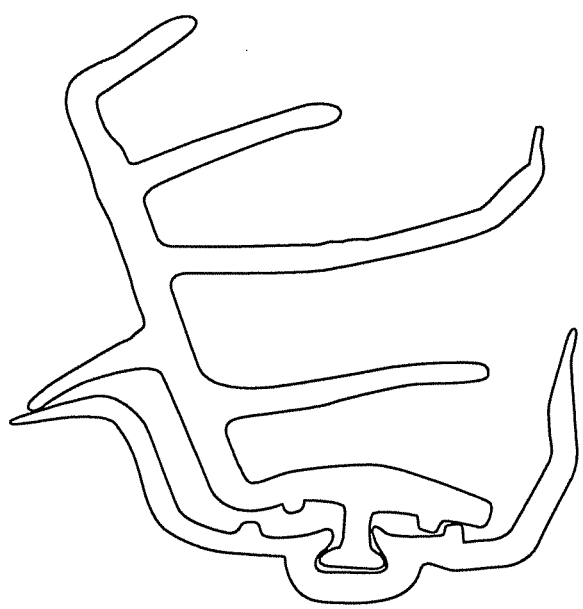
FIG. 21 illustrates an interlocking feature of the extruded expandable barriers shown in FIGS. 5 & 11.
Figure 22:
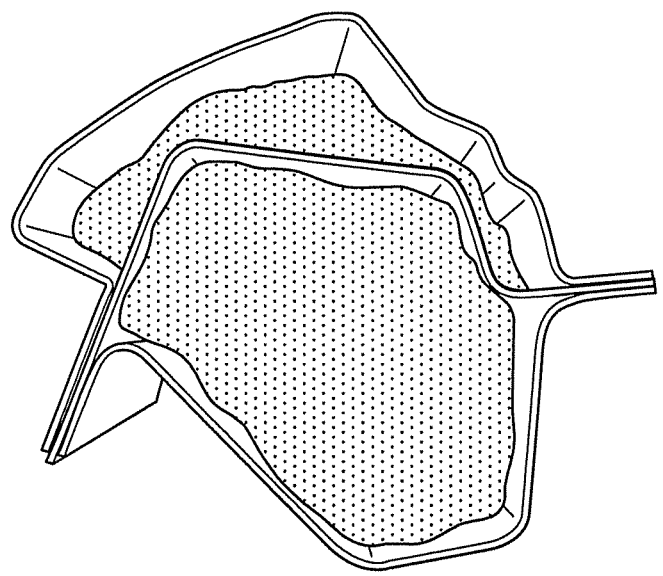
FIGS. 22-23 illustrate the extruded expandable barriers shown in FIGS. 5 & 11 in a post-expansion state within a cavity.
Figure 23:
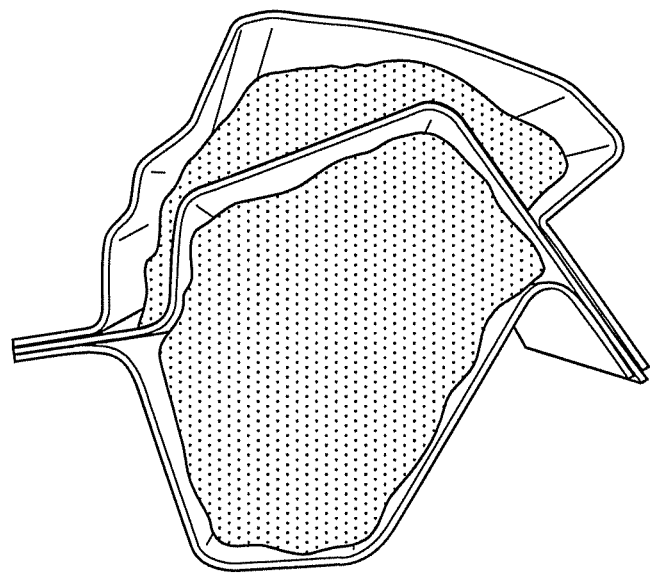

FIGS. 19-20 illustrate extruded expandable barriers 300, 500 in a pre-expansion state and secured within a cavity. As shown in FIGS. 19-20, barriers 300, 500 are secured within their respective cavities using an interference or friction fit, where end flanges and fingers apply pressure to the cavity walls and hold barriers 300, 500 in place. FIG. 21 illustrates an interlocking feature of extruded expandable barriers 300, 500. As previously discussed, barrier 300 may include a slot 310, and barrier 500 may include a generally "T" shaped protrusion 508. Slot 310 and protrusion 508 may be complementary, thereby allowing barriers 300 and 500 to interlock. By interlocking two or more barriers, a grouping of barrier parts may be used in vary large or oddly shaped cavities. The interlocking feature may also facilitate securing the barriers within a cavity. In addition, the interlocking feature may also facilitate providing additional expandable material in difficult to reach areas within a cavity, thereby improving the sealing characteristics of the within the cavity after the barriers undergo expansion. FIGS. 22-23 illustrate barriers 300, 500 in a post-expansion state within a cavity. As shown, the cavities are completely or substantially filled, thereby creating an efficient barrier against noise, wind, vibration, water, moisture, debris, and other unwanted contaminants.

Table 1 illustrates four different heating profiles labeled Temp 1-4, each of which may also be viewed as a set of extrusion parameters. Each heating profile shown in Table 1 includes desired temperatures in different parts of system 100, and also includes a particular screw speed shown in RPMs. Each profile was used and tested to form a barrier, such as barrier 500 as shown in FIGS. 11 and 13. The extrusion processes used to test the various heating profiles used screw R21 without mixing pins, 20 screens, and the expandable material used was SB-300. In order to improve the surface of barrier 500, the RPMs were lowered in order to increase the residence time in the barrel. Based on the desired result, the heating profile shown in the column labeled Temp 4 yielded a preferred surface. All temperatures are in degrees Fahrenheit, and RPMs are measured in rotations per minute, which correspond to the screw speed.

TABLE 1

|  | Temp 1 | Temp 2 | Temp 3 | Temp 4 |
| --- | --- | --- | --- | --- |
| Die | 220 | 220 | 225 | 235 |
| Gate | 207 | 220 | 225 | 235 |
| bzone 4 | 200 | 210 | 234 | 250 |
| bzone 3 | 194 | 200 | 220 | 245 |

TABLE 1-continued

|  | Temp 1 | Temp 2 | Temp 3 | Temp 4 |
|---|---|---|---|---|
| bzone 2 | 180 | 180 | 185 | 190 |
| bzone 1 | 165 | 165 | 165 | 165 |
| RPM | 60 | 60 | 60 | 42.8 |

Table 2 represents two additional heating profiles that include various extrusion parameters used to form a barrier, such as barrier 300 as shown in FIGS. 5 and 14. The extrusion process used to test the various heating profiles screw R21 without mixing pins, 20-40 screens, and the expandable material used was also SB-300. In order to improve the surface of barrier 300, the RPMs were lowered in order to increase the residence time in the barrel. Based on the desired result, the heating profile shown in the column labeled Temp 2 yielded a preferred surface.

TABLE 2

|  | Temp 1 | Temp 2 |
|---|---|---|
| Die | 235 | 220 |
| Gate | 235 | 220 |
| bzone 4 | 250 | 238 |
| bzone 3 | 245 | 239 |
| bzone 2 | 190 | 190 |
| bzone 1 | 165 | 165 |
| RPM | 49 | 23.2 |

FIG. 24 is a table representing shrink results from testing performed on various extruded barriers, illustrating different results using various screw speeds (RPMs), and barrier dimensions. Shrink analysis (212° F. for 15 minute bake) and a free bake analysis (350° F. for 25 minutes) were performed on samples from each run. The results from the shrink analysis are indicated in FIG. 24, and the results from the free bake analysis (free bake expansion results) are indicated in a table shown in FIG. 25.

FIG. 26 is a table representing various extrusion process testing runs using various extrusion parameters to form barriers of various shapes and sizes, as indicated in FIG. 26. The barriers formed from those testing runs were then subjected to shrink test and free bake tests. Shrink test analysis was performed at 212° F. for a 15 minute bake, and free bake analysis was performed at 350° F. for 25 minutes. After evaluating the shrink test and free bake results, a sample of the highest speed for the DB-240 and SB-255 material was used to bake out in a cavity (350° F. for 25 minutes). The results from those tests are illustrated in FIGS. 27 and 28, where FIG. 27 is a table representing shrink test results, and FIG. 28 is a table representing free bake expansion test results.

FIGS. 29-30 are tables representing various extrusion process testing runs using various extrusion parameters to form barriers of various shapes and sizes, as indicated in FIG. 29. The barriers formed from those testing runs were then subjected to shrink test and free bake tests. Shrink test analysis was performed at 212° F. for a 15 minute bake, and free bake analysis was performed at 350° F. for 25 minutes. The results from those tests are included in FIGS. 29-30.

As illustrated in Tables 1-2 and in FIGS. 24-30, the disclosed extrusion process may use a wide variety of different heating profiles that include a wide range of extrusion parameters to achieve different product results. For example, heating temperatures in various areas of extrusion system 100 may range from less than 100° F., to well over 200° F., and even more than 250° F. Furthermore, screw speeds may vary from very low RPMs, even less than 20 RPMs, to more than 80 RPMs. In addition, some extrusion systems may measure material speed in feet per minute (FPM) or feet per hour (FPH), as shown in the various tables. Different dies, cooling systems, and other components may also be used and/or changed to produce a desired result.

As previously discussed, an infinite number other variations of the illustrated preferred embodiments are contemplated to be include in the scope of the following claims. For example, while several specific examples of barriers are shown, the disclosed extrusion process is capable of being used to form barriers of various shapes, sizes, and configurations. Furthermore, various post-extrusion processes may also be used to further configure a barrier. For example, barriers may be cut, trimmed, or drilled or punctured to create holes, notches, or other physical features. In addition, barriers may be augmented or one or more mechanical or chemical fasteners, or additional materials. A barrier may include structures or features to facilitate the handling or movement of the barrier by robots or structures to facilitate installation.

A barrier may include a second material as well, such as a pre-activation sealer material. A barrier may include a placement area in the form of a ridge on which pre-activation sealer material may be placed. In addition, other structures may be used to accept the sealer material such as ledges, troughs and wells. The placement area may also serve other purposes or functions besides receiving the pre-activation sealer material such as directing the activated sealer material or ensuring that the barrier is properly fit in to the orifice.

Figure 31:
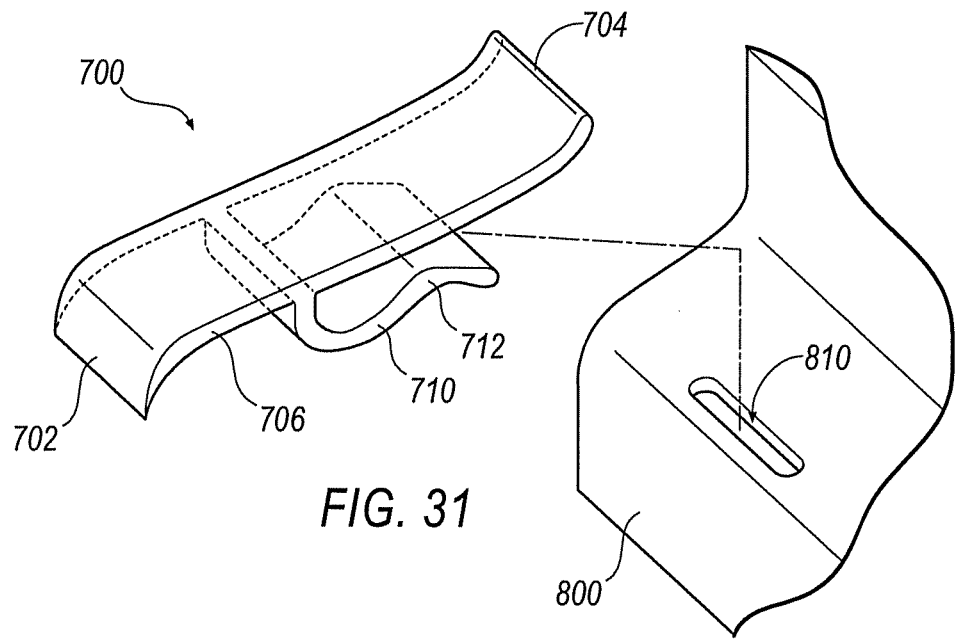
FIG. 31 is a perspective view of an extruded expandable barrier having an integrated tab configured to releasably secure to a side wall of a cavity.

FIG. 31 illustrates an extruded expandable barrier 700 manufactured utilizing the disclosed extrusion processes. Barrier 700 is an extrusion having curved flanges 702, 704 at each end of an elongated body 706. Barrier 700 also includes an integrated tab 710 disposed on body 706. As illustrated in FIG. 31, tab 706 is shaped to be inserted into a slot 810 of a cavity wall 800. Generally, slot 810 is a small slit or elongated oval aperture or hole in cavity wall 800. Tab 710 is a short strip of expandable material integrally formed with body 706 of barrier 700. Tab 710 may include one or more ridges 712 that can be used to orient barrier 700 in place, and also releasably secure barrier 700 to cavity wall 800. For example, barrier 700 can be releasably secured to cavity wall 800 through an interference or friction fit after inserting tab 710 into slot 810. Because tab 710 is integrated into body 706 of barrier 700, no post manufacturing process is required to add any mechanical fastener to barrier 700. Additionally, barrier 700 can be installed with little to no tooling, adhesives, etc. Of course, barrier 700 can be further secured to cavity wall 800 through the use of adhesives or mechanical fasteners.

Figure 32:
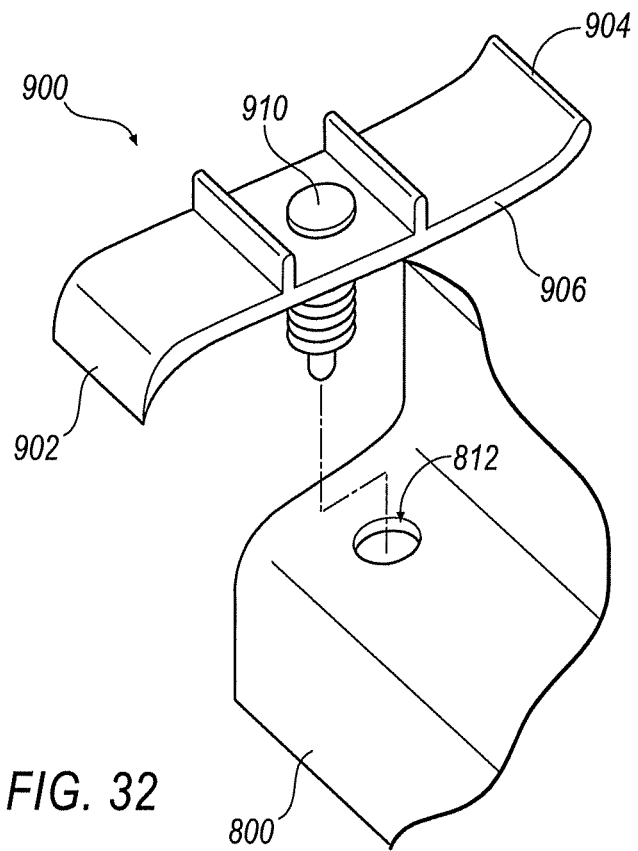
FIG. 32 is a perspective view of another extruded expandable barrier having a fastener configured to releasably secure to a side wall of a cavity.

FIG. 32 illustrates another extruded expandable barrier 900, also manufactured utilizing the disclosed extrusion processes. Barrier 900 is also an extrusion having curved flanges 902, 904 at each end of an elongated body 906. Barrier 900 includes a fastener 910 disposed through body 906. Fastener 910 is typically installed after extruding barrier 900 by punching a hole through body 906 and then inserting fastener 910 through that hole. Fastener 910 can be a nail, a screw, or a flanged fastener made of metal or plastic. Generally, fastener 910 is shaped to be inserted into an aperture 812 of cavity wall 800, thereby securing barrier 900 to cavity wall 800.

Figure 33:
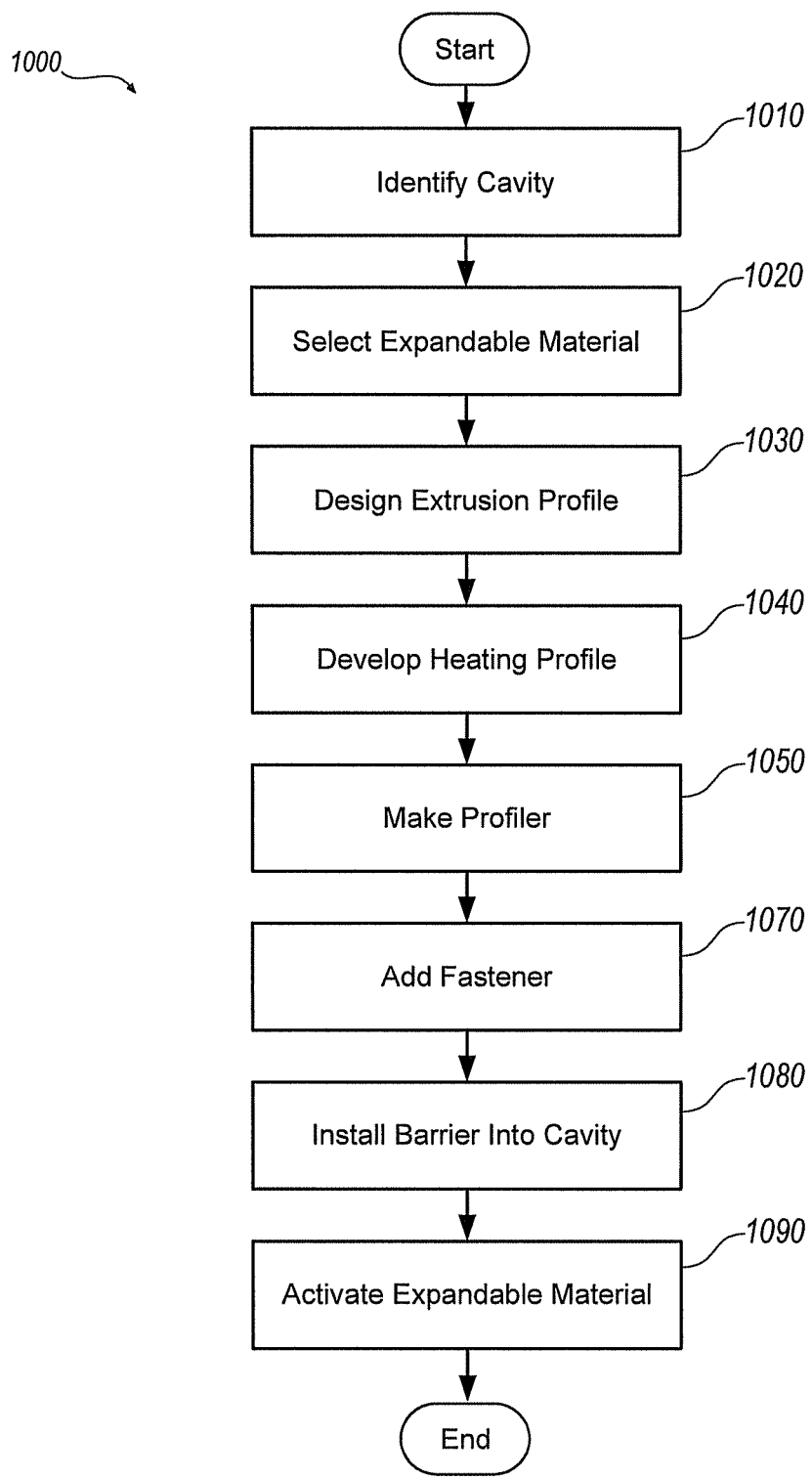
FIG. 33 illustrates an exemplary process for sealing a cavity.

FIG. 33 illustrates an exemplary process 1000 for sealing a cavity. Process 1000 begins in step 1010 by identifying a cavity to be sealed. Typically, an original equipment manufacturer will identify a particular cavity where sealing the cavity will result in overall decreased noise, vibration, or protect another portion of the product from fumes, dirt, dust, water, etc. Identifying the cavity may also include identifying the dimensions of the portion of the cavity to be sealed. For example, the dimensions can be obtained using engineering drawings or by measuring the interior space of the cavity, such as by measuring a cross-section of the cavity at a particular location.

Next, in step 1020, an expandable material will be selected. Typically, selecting a particular expandable material may depend on a particular set of requirements from a customer, such as an original equipment manufacturer. Additionally, the particular expandable material may depend on the overall size of the cavity to be sealed.

Next, in step 1030, an extrusion profile will be designed. Typically, the extrusion profile is designed to strategically place the expandable material throughout the cavity. Generally, the portions of the barrier, such as flanges and protrusions, will distribute the expandable material within the cavity in such a way as to ensure that the expandable material fills and seals the cavity after undergoing expansion. As previously discussed, an extrusion profile may include any design capable of being used in conjunction with the disclosed extrusion processes. For example, an extrusion profile may include en elongated section to span a substantial lateral portion of a cavity. Further, an extrusion profile may include curved end flanges, a tab, and one or more protrusion. An extrusion profile can be planar or substantially flat, curved, "C" shaped, "S" shaped, "U" shaped, "O" shaped, donut shaped, or any other suitable shape that can be used with the extrusion process and used to strategically place expandable material in the cavity. In addition, the extrusion profile may also include an interlocking or mating feature, such as a slot or "T" shaped protrusion, allowing two or more extruded barriers to be mechanically linked together through an interference fit, as previously described.

In addition, a cut length may also be selected in conjunction with the design of the extrusion profile. For example, an estimate of an amount of expandable material may be generated based on the size of the cavity to be sealed and the expansion properties of the selected expandable material. The volume per barrier can be calculated using a cut length and the extrusion profile design. The profiler design, i.e. shaped cut-out, of the extrusion profile provides an area that can be multiplied by the cut length of the extruded barrier to provide a close approximation of the volume of expandable material per part.

Next, in step 1040, a heating profile is developed. A heating profile may be developed through testing of a particular expandable material. Further, a heating profile may be developed by using an existing heating profile with the newly designed extrusion profile, and testing the extruded barriers for various parameters, such as shrinkage and expansion. A heating profile may include any number of heating and other parameters, such as screw speed, material feed rate, pressure, etc. A heating profile may also be adjusted after testing the seal of the post-expansion barriers in the cavities.

Next, in step 1050, a profiler is made in the shape of the selected extrusion profile. The profiler being a removable plate, a series of screens, or some other extrusion profile system. The profile is then typically installed in extrusion system 100.

Next, in step 1060, a barrier is extruded using system 100. Typically, system 100 is configured to use the selected heating profile and the extrusion profile to make the designed extruded barriers.

Next, in step 1070, a mechanical fastener may be added to the extruded barrier.

Next, in step 1080, the barrier is installed into a cavity. As previously discussed, the barrier may be secured or releasably secured within the cavity in any number of ways. For example, the barrier may include protrusions or flanges designed to be wedged into a weld seam within the cavity. The barrier may include a tab or fastener configured to mate with a corresponding slot or aperture in a cavity wall. Further, a barrier may be secured in place using an adhesive, a rigid carrier, etc.

Next, in step 1090, the barrier undergoes an activation process. If the barrier is made using a heat activated expandable material, the cavity may undergo a baking process to evenly heat the cavity and barrier and thereby activate the expandable material. After undergoing an activation process, the barrier expands to fill and seal the cavity. Following step 1090, the particular seal may be tested, measured, and the process may be further refined by redesigning the extrusion profile and/or the heating profile.

While the invention has been specifically described in connection with certain specific embodiments thereof, it is to be understood that this is by way of illustration and not of limitation, and the scope of the appended claims should be construed as broadly as the prior art will permit.

We claim:

1. A method of manufacturing an expandable barrier using an extrusion system, comprising:
   identifying a cavity to be sealed;
   designing an extrusion profile and manufacturing a profiler according to said extrusion profile;
   developing a heating profile to be used in the manufacturing of the expandable barrier, wherein said heating profile includes a plurality of different target temperatures intended to be concurrently maintained at different locations in the extrusion system;
   extruding an expandable material through said profiler using the extrusion system and applying the heating profile;
   regulating a plurality of temperature controlled zones according to the heating profile, wherein the temperature controlled zones are at different locations in the extrusion system, wherein the temperatures of the expandable material in the plurality of temperature controlled zones are maintained below a specific activation temperature of the expandable material; and
   cutting the extruded expandable material after being extruded through the profiler to form an extruded expandable barrier configured to seal the identified cavity.

2. The method of claim 1, further comprising co-extruding a nonexpandable material with the expandable material.

3. The method of claim 1, further comprising:
   maintaining at least one temperature controlled zone at a temperature at or below 250 degrees Fahrenheit.

4. The method of claim 1, further comprising increasing the temperature of the expandable material as the expandable material travels through a barrel of the extrusion system.

5. The method of claim 1, further comprising adding a mechanical fastener to the extruded expandable barrier.

6. The method of claim 1, further comprising
installing the extruded expandable barrier into the cavity; and
activating the expandable material to seal the cavity.

7. The method of claim 1, further comprising designing the extrusion
profile to include at least one of a curved flange, a protrusion, a tab, and a slot.

8. The method of claim 1, further comprising applying pressure to the cavity walls with the extruded expandable material prior to expansion of the expandable material by contacting the cavity walls with the expandable material.

9. The method of claim 8, wherein applying pressure to the cavity walls with the extruded barriers includes applying pressure to opposing interior surfaces defining the cavity.

10. The method of claim 8, further comprising holding the extruded barriers in place using the applied pressure of the extruded expandable material, the applied pressure applied to interior surfaces defining the cavity.

11. The method of claim 1, further comprising sizing the barriers to distribute expandable material across a substantial lateral portion of the cavity prior to expansion of the expandable material.

12. The method of claim 11, wherein the barrier is sized such that expandable material is distributed across an entire lateral portion of the cavity prior to expansion of the expandable material.

13. The method of claim 1, further comprising extruding the expandable material through the profiler using the extrusion system, the extrusion system utilizing the heating profile to regulate a plurality of temperature controlled zones, wherein the heating profile is configured to increase the temperature of the expandable material as the expandable material travels through a barrel of the extrusion system.

14. The method of claim 1, further comprising the step of interlocking said extruded expandable barrier to a second expandable barrier.

15. The method of claim 1, wherein said heating profile further includes a target speed for progressing said expandable material through the extrusion system.

16. The method of claim 15, wherein said heating profile further includes a rate for delivering raw expandable material to said extrusion system.

17. The method of claim 1, wherein the extrusion system comprises a barrel and a die, wherein the barrel includes at least two temperature controlled zones, wherein the die includes at least one temperature controlled zone.

18. The method of claim 17, wherein the barrel includes at least four temperature controlled zones.

19. The method of claim 17, wherein the target temperatures at the at least two temperature controlled zones of the barrel and the at least one temperature controlled zone of the die, are different from each other.

* * * * *